(12) United States Patent
Comas Corral

(10) Patent No.: US 7,228,955 B2
(45) Date of Patent: Jun. 12, 2007

(54) MACHINE FOR SUPPLYING/DISPENSING CONTAINERS AND LONG ARTICLES IN GENERAL

(75) Inventor: Javier Comas Corral, Barcelona (ES)

(73) Assignee: Tomas Mulet Valles, Barcelona (ES)

( * ) Notice: Subject to any disclaimer, the term of this patent is extended or adjusted under 35 U.S.C. 154(b) by 0 days.

(21) Appl. No.: 10/535,393

(22) PCT Filed: Nov. 20, 2003

(86) PCT No.: PCT/ES03/00589

§ 371 (c)(1),
(2), (4) Date: Dec. 20, 2005

(87) PCT Pub. No.: WO2004/048236

PCT Pub. Date: Jun. 10, 2004

(65) Prior Publication Data

US 2006/0157497 A1   Jul. 20, 2006

(30) Foreign Application Priority Data

Nov. 22, 2002   (ES) ................................ 200202691

(51) Int. Cl.
*B65G 47/14* (2006.01)
(52) U.S. Cl. ...................... 198/527; 198/526; 198/528; 198/543; 198/547; 198/567
(58) Field of Classification Search ........ 198/526–528, 198/530, 537, 539, 540, 543, 547, 562, 566, 198/567, 575, 608, 801; 209/522, 523
See application file for complete search history.

(56) References Cited

U.S. PATENT DOCUMENTS 3,392,815 A * 7/1968 Skeels, Sr. et al. ......... 198/388

| 3,662,872 A | 5/1972 | Nalbach |
| 3,690,437 A | 9/1972 | Kammann |
| 3,730,386 A * | 5/1973 | Monsees ........................ 221/7 |
| 3,776,346 A | 12/1973 | Dubuit |
| 3,797,640 A * | 3/1974 | Aidlin et al. ............... 198/380 |

(Continued)

FOREIGN PATENT DOCUMENTS

EP    0 578 602 A1   1/1994

(Continued)

Primary Examiner—Douglas Hess
(74) Attorney, Agent, or Firm—Merchant & Gould P.C.

(57) ABSTRACT

The invention starts with a hopper (1) where the objects are randomly introduced, with a bottom (2) tilted towards an adjustable outlet opening (3), arranged under the latter there is a unitary metering device (5) leading to a discharge plate (22) of a grooved front edge (23) so as to intertwine with blades (11) of a lifting means (6), wherein said plates are spaced by a magnitude which is not quite twice the width of the objects to be handled, a lifting means ending at a transfer mechanism consisting of a conveyor (27), also with grooved blades (28) acting on a base plate (29) framed by two rails (30) guiding the objects towards a drop opening (17), with means which make the objects swing during their fall so that they adopt the correct position when they reach an exit conveyor (41), between two side walls (34), another conveyor (36) collaborating with said conveyor (41), the former provided with a plurality of pushing means (35) spaced by a magnitude in accordance with the width of the objects to be conveyed.

14 Claims, 7 Drawing Sheets

U.S. PATENT DOCUMENTS

| | | | | |
|---|---|---|---|---|
| 3,844,411 A | * | 10/1974 | Lewis | 209/539 |
| 3,871,515 A | | 3/1975 | Randrup | |
| 4,271,953 A | * | 6/1981 | Smith | 198/347.1 |
| 4,480,740 A | * | 11/1984 | Wurmli | 198/400 |
| 4,681,209 A | * | 7/1987 | Marti | 198/392 |
| 4,735,343 A | | 4/1988 | Herzog | |
| 4,856,640 A | * | 8/1989 | Beswick et al. | 198/311 |
| 4,887,414 A | * | 12/1989 | Arena | 53/543 |
| 5,236,077 A | * | 8/1993 | Hoppmann et al. | 198/380 |
| 5,344,026 A | * | 9/1994 | Booth et al. | 209/580 |
| 5,370,216 A | * | 12/1994 | Tsuruyama et al. | 198/395 |
| 5,641,072 A | * | 6/1997 | Otake | 209/524 |
| 6,098,781 A | | 8/2000 | Lanfranchi | |
| 6,229,108 B1 | * | 5/2001 | Gaglione | 209/524 |
| 6,637,600 B2 | * | 10/2003 | Miyamoto et al. | 209/539 |

FOREIGN PATENT DOCUMENTS

| | | |
|---|---|---|
| EP | 0 995 701 A2 | 4/2000 |
| FR | 2 802 903 A1 | 6/2001 |
| GB | 547501 | 8/1942 |

* cited by examiner

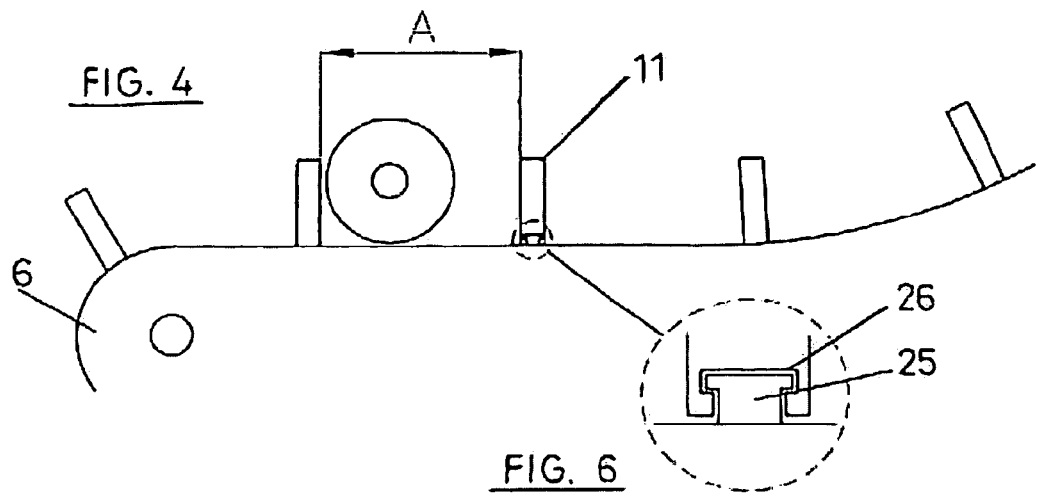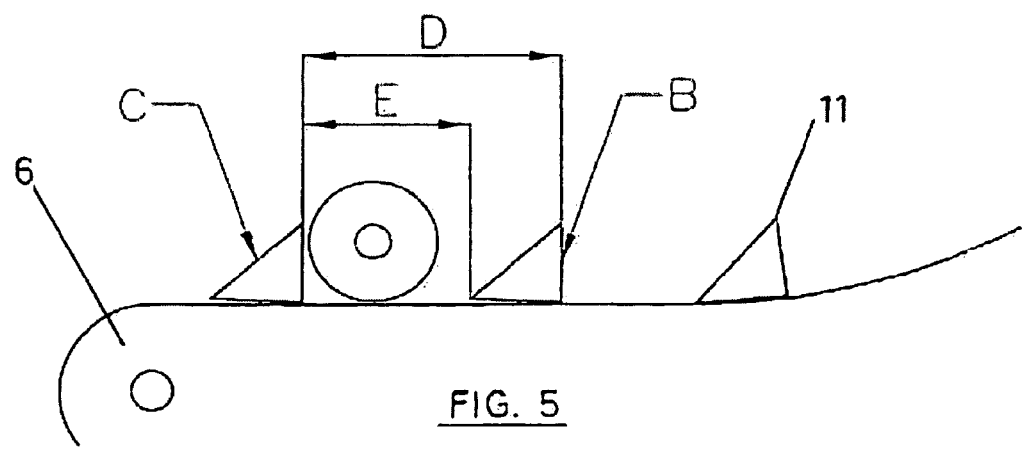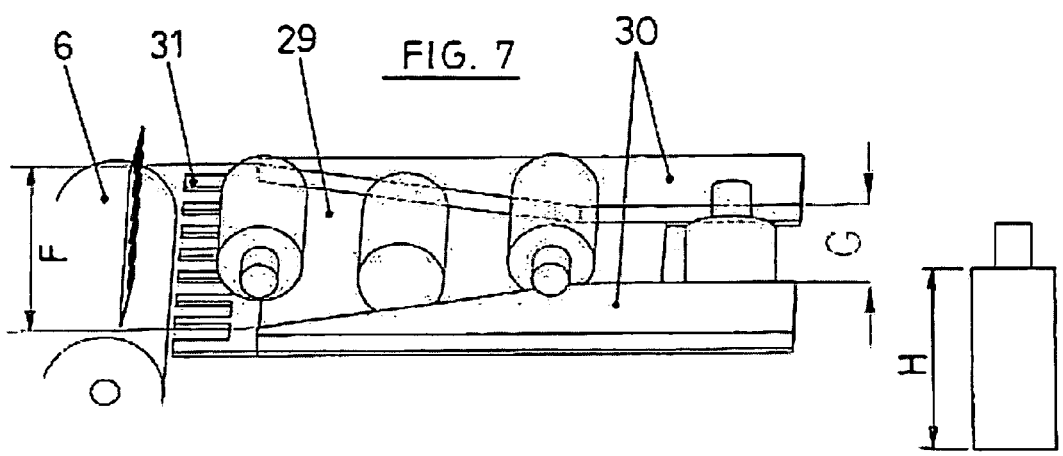

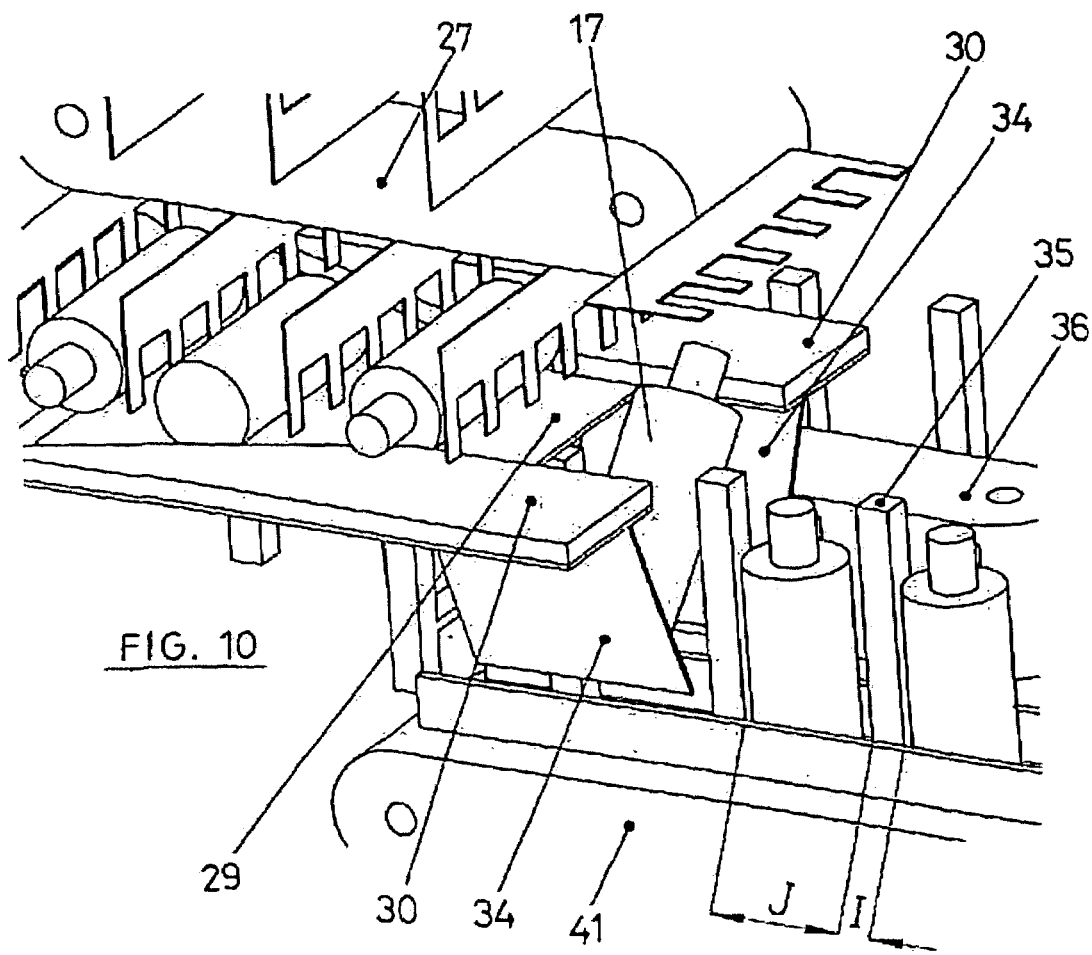
FIG. 10
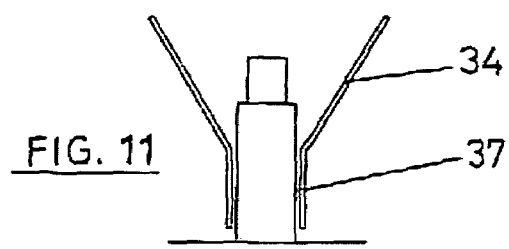
FIG. 11
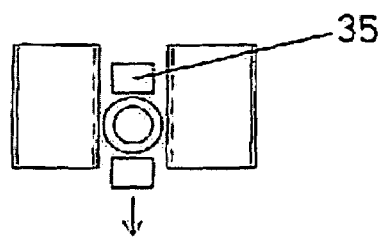

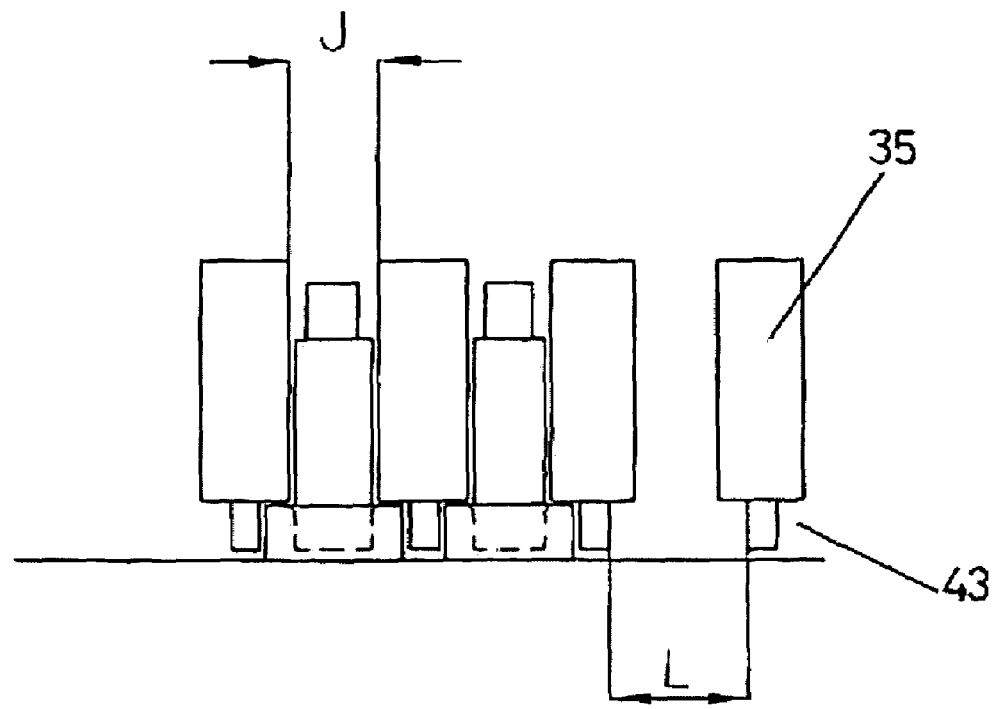
FIG. 12
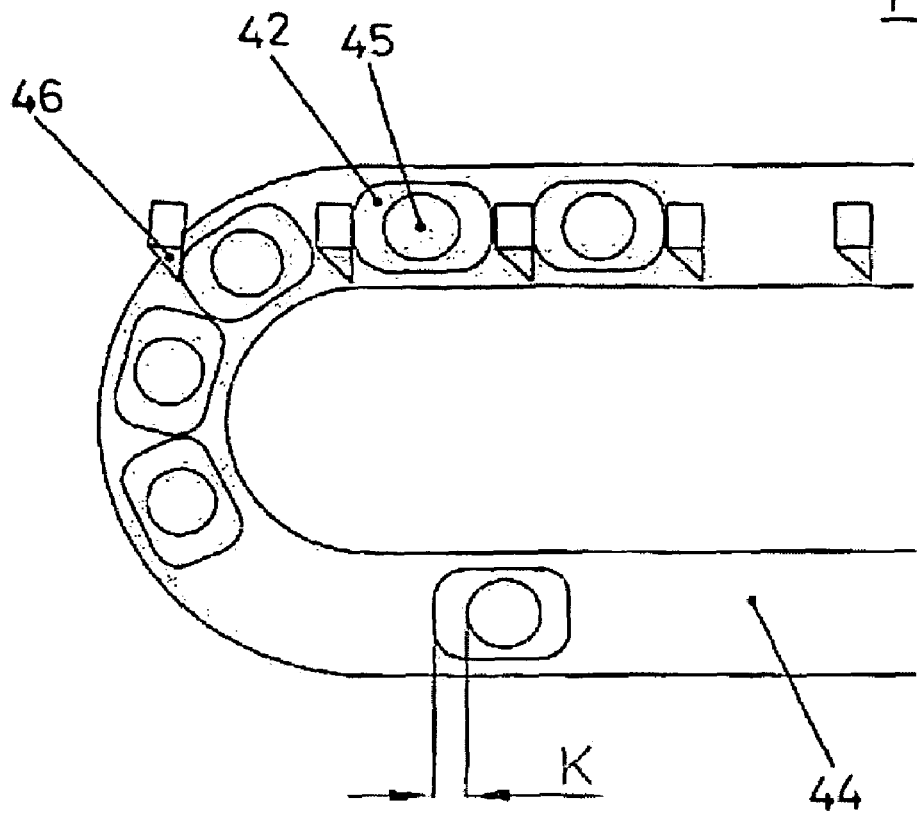

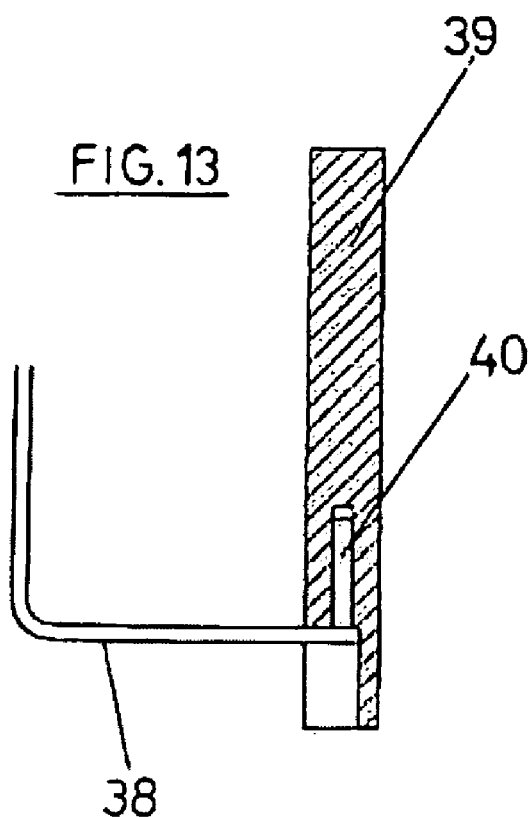
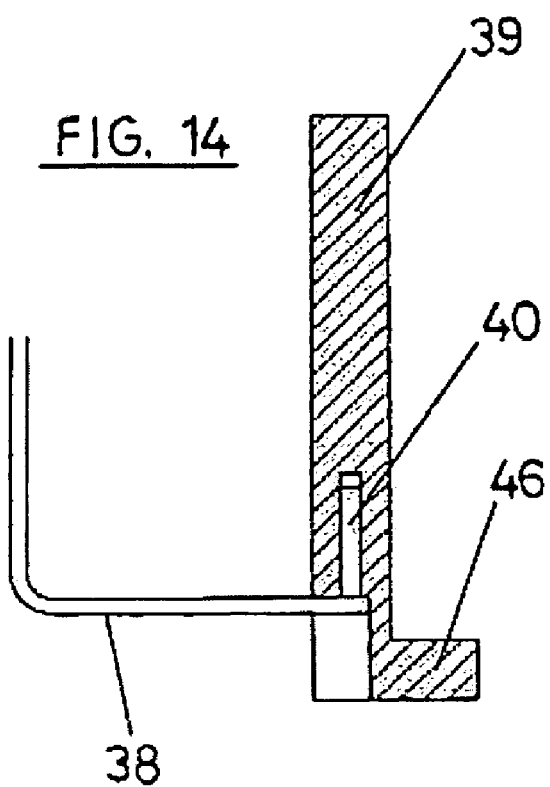

MACHINE FOR SUPPLYING/DISPENSING CONTAINERS AND LONG ARTICLES IN GENERAL

OBJECT OF THE INVENTION

The present invention relates to a machine particularly designed for feeding elongated objects, particularly containers, with or without a geometric differentiation on their longitudinal ends, including the random receiving of objects in a storage hopper, the selection and vertical positioning of the objects, as well as the exit conveyor means for said objects.

The machine is mainly applicable to handling bottles, jars or other containers, both in packaging lines and in screen-printing or labeling processes thereof, and generally in all those processes in which it is necessary to arrange elongated objects, whatever their geometric configuration may be.

BACKGROUND OF THE INVENTION

Although the current state of the art allows covering virtually any industrial need of feeding elongated objects, such as bottles for example, existing machines are not always capable of meeting certain requirements, such as feeding objects with no geometric differentiation on their ends, performing their task with a low noise level, optimizing the speed of movement of the objects so as to minimize the risk of marks thereon due to friction, blows, etc., All these machines have the common denominator of using compressed air, a use which is inappropriate in certain practical applications in which optimum sanitary conditions are required, as occurs in the case of the pharmaceutical industry.

These problems or limitations are present both in commonly used rotary operating feeders and in other linear operating solutions existing, given that in all of them the movement of the objects is performed in the longitudinal direction thereof, a high speed in said movement being caused.

The massive use of compressed air mentioned above so as to perform selection of the objects is, together with said high speed of movement, what causes a significant noise level.

Feed-dispensing machines with the drawbacks set forth above are found, among others, in U.S. Pat. Nos. 4,681,209; 4,463,846 and WO 00172616.

DESCRIPTION OF THE INVENTION

The feed-dispensing machine proposed by the invention resolves in a fully satisfactory manner the drawbacks set forth above in the different aspects discussed.

Careful handling of the products specifically constitutes an object of the invention, minimizing effects resulting from friction and blows thereon.

Another object of the invention is the reduction of room noise produced by the machine.

In turn constituting another object of the invention is the elimination of compressed air in those sanitary requirements so demanding it.

Another object is the feeding of elongated objects, whatever their geometric configuration may be.

Finally, another object is to achieve a controlled feed of the object during the entire feed process.

To that end and more specifically, four operating stations are arranged in the proposed machine, a first object receiving and pre-selection station, a second object transfer and selection station, a third vertical positioning station and a fourth exit conveying or evacuation station.

Collaborating in the first area is the inevitable hopper in which the products are randomly introduced, which hopper, according to one of the features of the invention, has a bottom opening for the dropping of the objects, with the collaboration of an adjustable hatch, which specifically allows varying the length of said opening, immediately under which either a blade metering device or a reciprocating movement metering device is arranged, holding back the objects coming from the hopper and delivering them to a pre-selection lifting means.

According to another feature of the invention, the lifting means, with classic object dragging blades, has grooved blades which, in combination with an also grooved edge of the supply plate coming from the metering device, assures a perfect capturing of the objects by said lifting means, with the additional particularity that the spacing between blades is less than twice the maximum width of the objects to be handled. The lifting means blades can be planar or adopt a triangular profile, such that in the latter case the spacing between blades must also be less than twice the maximum width of the object to be handled.

At the beginning area, the lifting means is further provided with adjustable side walls which can be adjusted on a grooved guide, these adjustable walls of the lifting means being combined with hatches of the metering device.

According to another feature of the invention, arranged at the outlet of the lifting means, provided with two end straight path sections and an intermediate notably curved path section of an upwards concavity, there is a grooved transfer blade which ends at a base plate, with an upwards or downwards horizontal surface framed by a pair of rails forming a closed funnel in the feed direction of the object, said base plate ending with an outlet opening for the dropping of the objects.

This dropping may occur by supporting the objects on one of the side rails and through only one of their ends by means of a rod centrally located at the outlet opening on which the object sways since its center of gravity is offset with respect to said rod; or in a third alternative, by means of retractable guides which, depending on which of them is actuated, make the object fall in one direction or the other.

Arranged under the drop opening leading to the exit conveyor belt are two static and tilted walls, said conveyor belt being aided by vertical pushing means located between said static walls, the space between pushing means being equivalent to the maximum width of the object, and the tilted walls ending in vertical flaps for perfect guiding of the already vertically arranged objects.

Finally and according to another feature of the invention, it has been provided that the pushing means have notches or restrictions on their bottom extremity for the placement of individual supports for the objects to be handled should the latter lack stability or require special handling making said supports advisable.

DESCRIPTION OF THE DRAWINGS

To complement the description being made and for the purpose of aiding to better understand the features of the invention, according to a preferred practical embodiment thereof, a set of drawings is attached as an integral part of said description, wherein the following is represented with an illustrative and non-limiting nature:

FIG. 4 shows a side elevational view of a partial schematic detail of the pre-selection lifting means.

FIG. 5 shows a representation similar to the previous figure, wherein the configuration of the blades of said lifting means has been changed.

FIG. 6 shows a partial detail of the fixing of the blades of FIG. 4.

FIG. 7 shows a perspective view of a detail of the end area of the lifting means and of the object transfer and selection area, where a side elevational view of one of said objects is schematically represented.

FIG. 10 shows a detail of the machine at the level of union between the object transfer and selection station and the vertical positioning end station.

FIG. 11 shows a plan profile view of a detail of the beginning of the vertical positioning station.

FIG. 12 shows a side elevational and plan view of a detail of the evacuation or outlet means in the specific case in which the latter incorporates individual supports for stabilizing the objects.

Lastly, FIGS. 13 and 14 show two embodiment variants for the pushing parts collaborating in the exit conveyor belt, removably coupled to the fixing arm.

PREFERRED EMBODIMENT OF THE INVENTION

Figure 1:
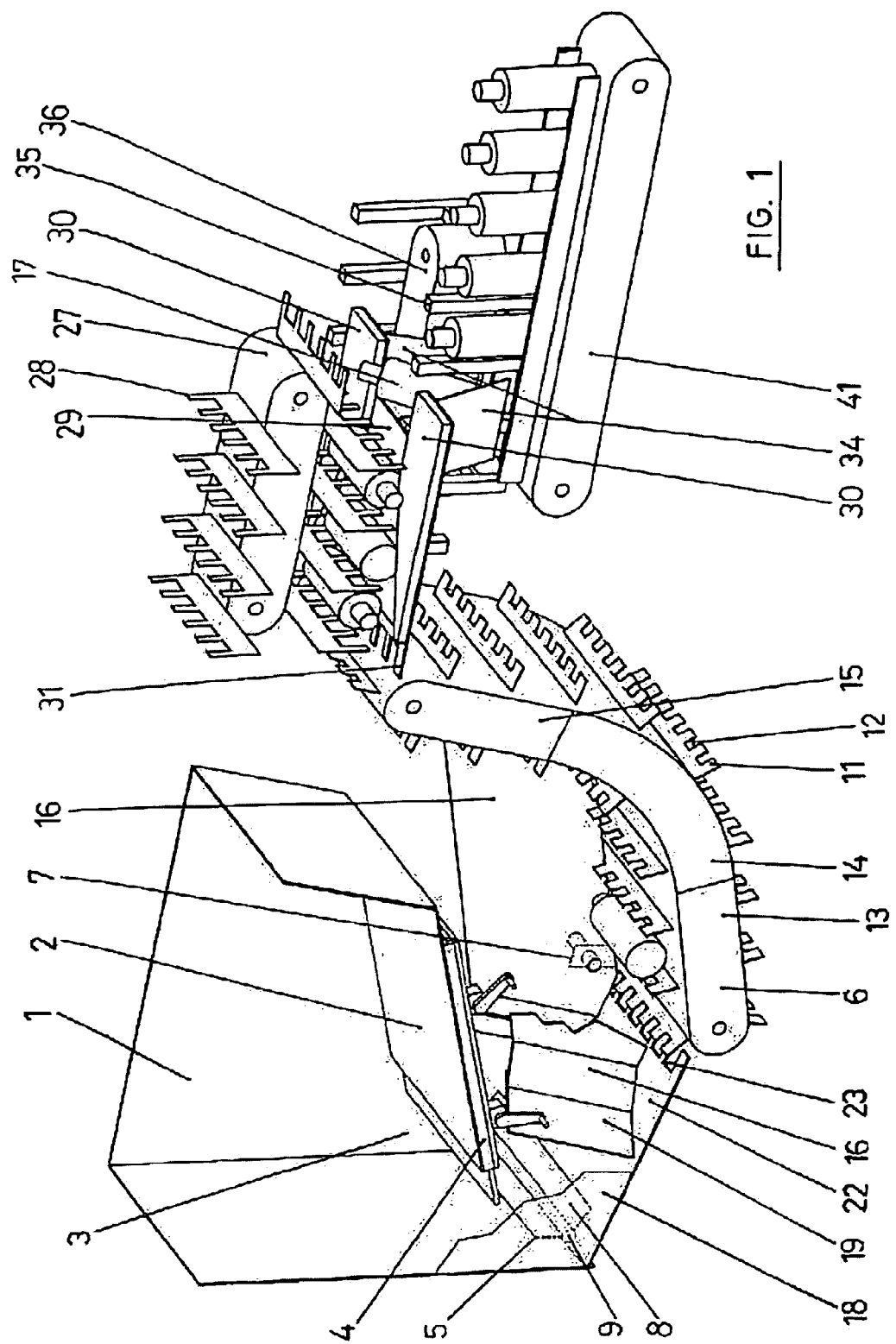
FIG. 1 shows a perspective view of a schematic representation of a container and generally elongated item feed-dispensing machine, carried out according to the object of the present invention.

In view of the figures discussed and starting from the object receiving and pre-selection station, it can be seen how the proposed machine is formed from a hopper (1) where the objects are randomly introduced, said hopper having a tilted plane (2) in its bottom portion partially closing it, defining an opening (3) on the bottom end of said plane for dropping the objects. In order to adjust the opening (3) to different object sizes, there is an adjustable hatch (4) allowing the reduction of the length of said opening, keeping its width constant.

On the bottom portion of said opening there is a metering device (5) which holds the objects coming from the hopper (1) and delivers them to a pre-selection lifting means (6), according to the requirements of the latter, requirements which are determined by a sensor (7) controlling the level of objects at the beginning of the lifting means (6), giving a go ahead or stop signal for the operation of the metering device (5) through the general control panel of the machine.

Said metering device (5) is formed by two or more blades (8) arranged radially about a shaft (9) perpendicular to the feed direction of the lifting means and performs the functions of holding and controlled metering of objects by means of a rotating motion.

The area for dropping objects from the metering device to the lifting means (6) is defined by respective side walls (18) of the metering device and by a discharge plate (22) forming the plane tilted downwards towards the lifting means, acting as a ramp for dropping the objects towards said lifting means. Said plate (22) has a grooved area (23) in its bottom portion which intertwines with the blades (11) of said lifting means when they come together.

Operation of the metering device can be any type producing a continuous rotation susceptible to being stopped according to the signal coming from the sensor (7), such as an electromotor or a transmission from the lifting means (6) provided with a disconnection clutch.

Figure 2:
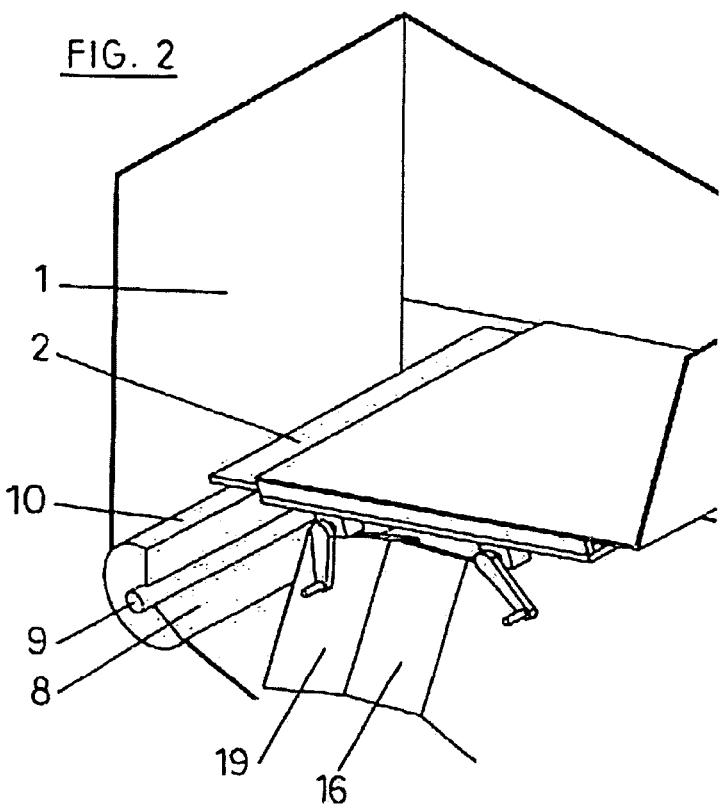
FIG. 2 shows a detail of the machine of the previous figure, at the level of its feed hopper, provided with a reciprocating movement metering device replacing the blade metering device of the previous figure.

However, the metering device may be structured according to an embodiment variant shown in FIG. 2, wherein said metering device is a reciprocating movement device and is formed by two blades (8) joined at the axis of rotation and also joined by a cylindrical section (10), the purpose of the latter being to prevent objects from remaining housed in areas where they could become damaged due to the blades in said reciprocating motion. This variant can be actuated in a manner similar to the continuous rotation version or by means of a dynamic fluid cylinder.

The pre-selection lifting means (6) consist of a conveyor provided with blades (11) for dragging and lifting the objects, the configuration and arrangement of which determine that, at the end of the lifting, a maximum of one object is housed in the space defined by two consecutive blades.

Said blades (11) have grooves (12) that are complementary with the grooves (23) of the discharge plate (22), allowing their intertwining.

Said lifting means (6) have a receiving area (13) where the objects are located in a lowered transverse position with respect to the feed direction within the spaces defined by the blades (11).

The receiving area is characterized by its rectilinear configuration, arranged horizontally or with a slight upwards tilt so as to facilitate the entrance of bottles in said spaces. After this area is the pre-selection area (14) where the conveyor acquires a curved configuration in the vertical direction until obtaining such a tilt that it causes the fall of objects poorly positioned between the blades or of those objects which may be on top of another, such that at the end of the pre-selection area there is a maximum of one object in each space.

The curved configuration of this area is particularly important since the blades acquire a radial geometric configuration with respect to one another, whereby reducing the distance between their top or free ends, favoring the dropping of those objects on top of one another or poorly placed in the spaces defined by the blades (11).

The end portion of the lifting means is formed by a new straight section (15) that lifts the already pre-selected objects up to the transfer station, and the tilt of which coincides with that of the top end of the pre-selection area (14).

The lifting means (6) have arranged in at least one of their receiving and pre-selection areas respective side walls (16) guiding the fall of the objects to their correct housing between the blades (11), the distance of said walls being adjusted so as to make the feeding of objects with very different lengths possible in a single machine.

Figure 3:
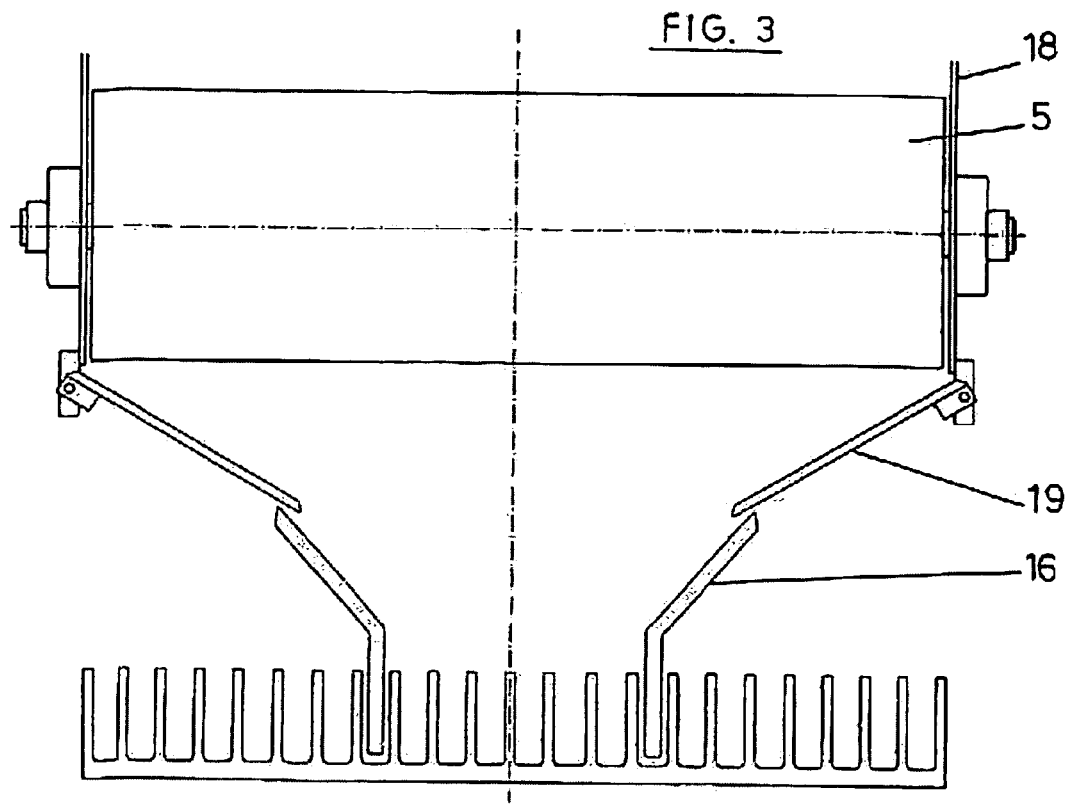
FIG. 3 shows a plan view of a detail at the level of the metering device outlet area.

Given that the adjustment of said walls (16) must be adjusted in any case to the fixed discharge width of the metering device (5), the side walls (18) of the metering device have respective articulated hatches (19) which are supported on the side walls (16) of the lifting means such that adjusting the distance between the side walls (16) increases or decreases the distance between them, opening or closing the hatches (19) of the metering device, as can particularly be observed in FIG. 3.

In order for the curved pre-selection area (14) to carry out its task, a useful distance (A) between two consecutive blades (11) is necessary, as shown in FIG. 4, which does not allow more than one object to be fully placed within it. Therefore, the useful distance between said blades (11) must be less than twice the width and thickness of the object to be selected, useful distance (A) being understood to mean the distance corresponding to the free space existing between the front and rear sides of two consecutive blades.

A variant of said blades, the one shown in FIG. 5, contemplates an asymmetrical transverse section (20) for the blades, wherein side (B) of the blade pushes the object while side (C) has a slope that reduces the width of the following housing such that the distance (D) between two consecutive blades in the top portion thereof may be greater than twice the diameter or width of the object, and in exchange distance (E) in the lower portion defining the space for housing the object remains less than two times its diameter or width.

This variant is particularly important for achieving higher object lifting speeds, since the greater distance (D) between blades facilitates the entrance of the objects into the housings.

The blades of the lifting means are interchangeable so as to make it possible to handle a variety of objects. To that end, there is a grooved guide (25), particularly visible in FIG. 6, fixed to the conveyor and arranged perpendicularly to the feed direction, which fits with a counter-groove (26) existing in the bottom portion of the blade, such that the latter can be interchanged by means of a simple lateral movement, said blades being provided with locking means preventing any accidental movement.

Now in discussing the object transfer and selection area, once the pre-selection of the objects is performed in the lifting means, the former are transferred to the selection station so as to determine which of their longitudinal ends should be in the top portion and which one in the bottom portion when vertically positioned.

Said transfer is performed by means of a conveyor (27) that can be seen in its entirety in FIG. 1, the blades (28) of which are interchangeable and synchronized with the blades (11) of the lifting means, they horizontally push the object, making it move forward linearly in the same transverse arrangement in which the object is received from the lifting means, arranging in the space existing between the lifting means and the selection station a grooved transfer plate (31) which holds the object while at the same time allows the intertwining of the blades (11) of the lifting means.

Said selection station is formed by a base plate (29) that holds the object during its linear forward movement due to the pushing of the blades (28) of the transfer conveyor (27) and rails (30) appropriately arranged according to the adopted selection criterion.

Depending on the features of the object, the contact surface of the base plate (29) with the object could be horizontally arranged or it could have an upwards or downwards tilt so as to adjust the height of the transfer blades (28) to the selection criterion.

The transfer blades (28) coincide with the blades (11) of the lifting means at the point of intersection of both, said transfer blades (28) having the corresponding counter-grooves making said coinciding possible.

In the last section of the selection station, the base plate (29) has a central opening (17) having sufficient dimensions so that the object cannot be held, the object falling to the positioning area.

According to an embodiment variant, said selection occurs by means of the geometric differences of the longitudinal ends, as shown in FIG. 7. In this case, the rails (30) located on the base plate (29) are arranged in a funnel shape with respect to the feed direction of the object, such that they have a distance (F) between one another at the front end of the funnel, exceeding the total length of the object, and the distance (G) at the back end corresponds to the length (H) of the body of the object, in other words, with no geometric differentiation, such that when the object reaches this area of the funnel, its geometric differentiation is located above the corresponding rail.

At the end of the funnel formed by the selection rails (30), the latter extend towards the opening of the base plate in a parallel arrangement in the feed direction such that when the object reaches said opening, falling through it, it is momentarily held by its end corresponding to its geometric differentiation by the rail located under it, whereby the object falls with the opposite end first.

Figure 8:
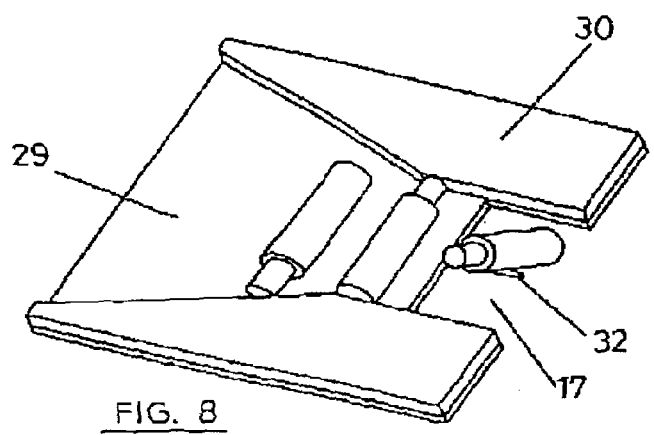
FIG. 8 also shows a perspective view of an embodiment variant in the object transfer and selection area.

Another selection criterion, the one shown in FIG. 8, consists of allowing the object to fall towards the longitudinal location of its center of gravity. In this case, the rails have the same configuration, first funnel shaped and then in parallel arrangement, but unlike the previous selection criterion, centering of the object is performed by taking in its entire length, the rails having sufficient height so as to take in the longitudinal ends of the object if it is an irregular object.

Arranged in the opening of the base plate (29) is a rod (32) aligned in the feed direction of the object and located on the axis of symmetry of the rails, such that when the object is located above said opening, it is suspended by the rod (32), whereby any shifting of its center of gravity with respect to its middle longitudinal point coinciding with the rod (32) causes said object to fall precisely towards the side where its center of gravity is located.

Figure 9:
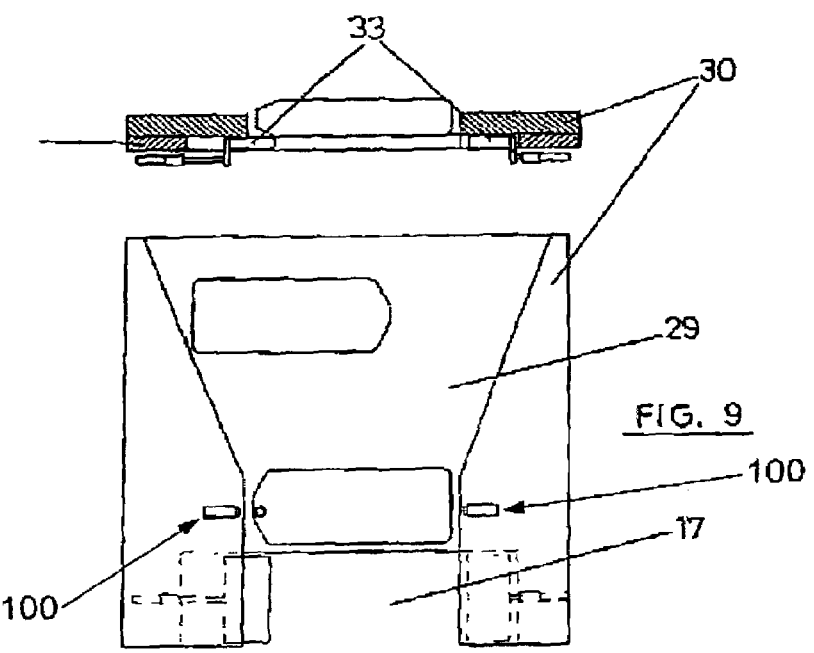
FIG. 9 shows a plan and cross sectional view of another embodiment variant of the object transfer and selection area of the machine.

Another selection criterion, the one shown in FIG. 9, consists of the identification of graphic signs or marks which may determine a specific position of the object. In this case, the arrangement of the rails is similar to that of the selection criterion using the center of gravity, disregarding the central rod (32) and one or several sensors suitable for identifying the differences that the object may have being arranged.

Said sensors 100 indicate the selection position to the machine control panel, retractable guides (33) located under the rails, one on either side, in the base plate opening area, being actuated such that one of the ends of the object is located above the retractable guide, actuated in its selection position, whereas the guide of the opposite side remains retracted under the corresponding rail. Said guide actuated in its selection position momentarily holds the object such that the latter falls on its opposite end.

The operation of said retractable guides (33) can be any type that is susceptible to causing the described movement, for example by means of dynamic fluid cylinders.

After this is the vertical positioning station, also shown in its entirety in FIG. 1, such that located under the opening of the base plate (29) are two tilted static walls (34), arranged parallel to the feed direction of the object which form an open assembly, the elevated cross section of which defines an inverted trapezium with its top and bottom sides open. Moving linearly inside said assembly are vertical pushing means (35) attached to a conveyor (36) defining the horizontal path of said pushing means.

The synchronization between the forward movement of the pushing means (35) and that of the transfer blades (28) causes that when the object falls through the opening of the base plate (29), it is located between two pushing means, the thickness (I) of which, as seen in FIG. 10, defines an unoccupied distance (J) between shafts equivalent to the maximum width of the object, making it move forward between the tilted walls, such that a trapezoidal drop conduit is defined, forcing the object to be vertically positioned during its forward movement. Said tilted walls (34) can have a vertical or slightly tilted bottom flap (37), as observed in FIG. 11, if the positioning of the object so requires.

Each one of the pushing means (35) is formed by a fixing arm (38), as seen in FIG. 13, attached to the conveyor and a vertical pushing part (39) joined to said arm by means of one or more vertical locking profiles (40), such that said pushing part is easily removable in a simple vertical movement.

The evacuation of the already positioned objects is carried out by means of a conveyor (41), also seen in its entirety in FIG. 1 and in greater detail in FIGS. 10, 11 and 12, said objects being able to be placed directly on said conveyor or else be housed in individual supports (42), such as in the case of unstable containers for example.

In this case, the pushing means (35) have on the bottom portion of their front and back sides respective notches or recesses (43) equivalent to the wall thickness (K) of the individual supports (42) such that said individual supports coming from a general conveyor (44) are located in the space (L) defined by the notches (43) of two consecutive pushing means (35), whereby the distance of its top portion (J) equivalent to the maximum width of the object is centered with the housing (45) of the individual support. As a result, the object positioned vertically during its fall is housed directly in the corresponding individual support (42).

Said pushing means (35) likewise have on their bottom portion a wedge projection (46), FIGS. 12 and 14, causing the separation between the individual supports (42) accumulated on the general conveyor (44), regulating their entrance into spaces (L) defined by the notches (43) of the pushing means (35).

The invention claimed is:

1. A container and generally elongated item feed-dispensing machine, of the type including a hopper (1) in which objects are randomly introduced and in which said objects finally adopt a vertical arrangement in desired positions, comprising: a hopper having an outlet, wherein arranged at said outlet of said hopper (1) is a metering device (5–10) leading to a discharge plate (22) ending at a lifting means (6) provided with a plurality of blades (11) of a grooved free edge, said discharge plate (22) having an also grooved edge (23) so as to intertwine with the blades (11), and said lifting means (6) ending at a transfer plate (31), also of a grooved edge, for access to a transfer and selection station in which a base plate (29) framed by two side rails (30) collaborates, located on which is a conveyor (27), located above the base plate (29) and provided with grooved blades (28) similar to those of the lifting means (6), a plate (29) provided with a central opening (17) for the dropping of the objects, with a positional selection criterion of the objects, towards a vertical positioning station having a first end located under the opening (17) of the base plate (29), said vertical positioning station having a second end whereby movement of objects from said first end to said second end defines a feed direction for the object, wherein two tilted and static walls (34) are provided, arranged parallel to said feed direction of the object, linearly moving forward inside of which are vertical pushing means (35) attached to a conveyor (36) defining a horizontal path for said pushing means (35) which drag the objects, separated from one another, on a bottom conveyor (41) on which they are placed.

2. A container and generally elongated item feed-dispensing machine according to claim 1, wherein said metering device (5) is formed by two or more blades (8) radially arranged about a shaft (9) perpendicular to said feed direction of said lifting means, which shaft is provided with a duly controlled rotational movement.

3. A container and generally elongated item feed-dispensing machine according to claim 1, wherein said metering device is formed by a shaft (9) attached to which are two radial blades (8), said two radial blades defining a first area and a second area circumferentially therebetween, said two radial blades further joined to one another by a cylindrical section (10) in said first area and defining a void in said second area, said cylindrical section arranged and configured to close said outlet of said hopper (1), said metering device being actuable, in a duly controlled reciprocating movement, so as to locate said void in front of said outlet of said hopper (1).

4. A container and generally elongated item feed-dispensing machine according to claim 1 wherein said metering device is formed by a shaft (9) attached to which are two radial blades (8) joined to one another by a cylindrical section (10) closing said outlet of said hopper (1), said metering device being able to be actuated, in a duly controlled reciprocating movement, so as to put a space between said two blades (8) in front of said opening; and located on said discharge plate (22) are two side walls (18), while at the same time arranged at the beginning of said lifting means (6) are two other side walls (16) on which respective articulated hatches (19) are supported which guide the objects towards said lifting means (6).

5. A container and generally elongated item feed-dispensing machine according to claim 1, wherein said lifting means (6) has a receiving area (13) where the objects are located in a lowered transverse position with respect to the feed direction in the spaces defined by said blades (11), of a rectilinear profile, arranged horizontally or with a slight upwards inclination so as to facilitate the entrance of the objects, a pre-selection area (14) where said conveyor acquires a curved configuration in the vertical direction so as to cause poorly placed objects to fall, and an end area in which its profile is straight again and rises up to the transfer station.

6. A container and generally elongated item feed-dispensing machine according to claim 5, wherein the distance between said blades (11), which can be planar or of a triangular profile, is less than twice the width or thickness of the object to be selected.

7. A container and generally elongated item feed-dispensing machine according to claim 5 wherein the distance between said blades (11), which can be planar or of a triangular profile and having a bottom edge, is less than twice the width or thickness of the object to be selected; and
    said blades (11) of said lifting means (6) are exchangeable so as to make it possible to handle different types of objects, for which purpose there is a grooved guide (25) fixed to said conveyor and arranged perpendicularly to the feed direction that fits in a counter-groove (26) existing on the bottom edge of the blade.

8. A container and generally elongated item feed-dispensing machine according to claim 1, wherein said side rails (30) of said object transfer and selection station are arranged in a funnel shape with respect to the feed direction of the object, having a maximum spacing in an initial area and a minimum spacing in an area, said maximum spacing exceeding the total length of the object, and said minimum spacing corresponding to the length of the body of said object defining geometric differentiation such that when the object reaches said end area, the geometric differentiation is located above the corresponding rail, making the opposite end drop first.

9. A container and generally elongated item feed-dispensing machine according to claim 1, wherein said rails (30) located on said base plate (29) are arranged in a funnel shape with respect to the feed direction of the object, such that the front end of said funnel has a width exceeding the total length of the object, and the outlet width matches the total length of said object, said base plate (29) having a rod (32) aligned in the feed direction of the object and located between said rails (30), such that when the object is located above said opening (17) it is suspended by said rod (32), swinging due to the offset between its center of gravity and said rod (32).

10. A container and generally elongated item feed-dispensing machine according to claim 1, wherein said rails (30) located on said base plate (29) are arranged in a funnel shape with respect to the feed direction of the object, its initial spacing being greater than the total length of the object, whereas its spacing at its outlet matches said total length of the object, the transfer section incorporating one or several suitable sensors for identifying the differences which the object may have, and said sensors triggering retractable guides (33) located under the rails (30), said sensors location one on either side above the opening (17) of said base plate (29), said guide (33) corresponding to the end of the object which should adopt a lower position being refracted.

11. A container and generally elongated hem feed-dispensing machine according to claim 1, wherein located under the opening (17) of the base plate (29) are two tilted and static wails (34) arranged parallel to the feed direction of the object, forming an open drop conduit leading to said bottom conveyor (41), said pushing means (35) acting on said open conduit, which pushing means are in turn attached to a said conveyor (36) defining a horizontal path for said pushing means, which are spaced from one another by a magnitude that is equivalent to a maximum width of the object.

12. A container and generally elongated item feed-dispensing machine according to claim 11, wherein each pushing means (35) is formed by a fixing arm (38) attached to the conveyor (36) and a vertical pushing part (39) joined to said arm by means of one or more vertical locking profiles (40) such that said pushing part is easily removable by vertical movement.

13. A container and generally elongated item feed-dispensing machine according to claim 11, wherein each pushing means (35) is formed by a fixing arm (38) attached to said conveyor (36) and a vertical pushing pan (39) joined to said arm by means of one or more vertical locking profiles (40) such that said pushing part is easily removable by vertical movement; and said pushing means (35) incorporate respective notches or recesses (43) on the bottom portion of their front and back sides for coupling to individual supports (42).

14. A container and generally elongated item feed-dispensing machine according to claim 11, wherein each pushing means (35) is formed by a fixing arm (38) attached to said conveyor (36) and a vertical pushing part (39) joined to said arm by means of one or more vertical locking profiles (40) such that said pushing part is easily removable by vertical movement; and said pushing means (35) incorporate respective notches or recesses (43) on the bottom portion of their front and back sides for coupling to individual supports (42); and the pushing means (35) have a wedge projection (46) on their bottom portion causing separation between one another when they are accumulated on a general conveyor (44), regulating their entrance into spaces defined by said notches (43) of said pushing means (35).

* * * * *